US012027773B2

(12) United States Patent
Evtyushkin et al.

(10) Patent No.: US 12,027,773 B2
(45) Date of Patent: Jul. 2, 2024

(54) WIDE SCANNING PATCH ANTENNA ARRAY

(71) Applicant: Samsung Electronics Co., Ltd., Suwon-si (KR)

(72) Inventors: Gennadiy Aleksandrovich Evtyushkin, Moscow (RU); Elena Aleksandrovna Shepeleva, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 328 days.

(21) Appl. No.: 17/567,627

(22) Filed: Jan. 3, 2022

(65) Prior Publication Data

US 2023/0019565 A1 Jan. 19, 2023

Related U.S. Application Data

(63) Continuation of application No. PCT/KR2021/019956, filed on Dec. 27, 2021.

(30) Foreign Application Priority Data

Jul. 16, 2021 (RU) ........................... RU2021121142

(51) Int. Cl.
*H01Q 21/24* (2006.01)
*H01Q 3/00* (2006.01)
*H01Q 3/24* (2006.01)
*H01Q 5/314* (2015.01)
*H01Q 21/06* (2006.01)

(52) U.S. Cl.
CPC ........... *H01Q 21/065* (2013.01); *H01Q 3/005* (2013.01); *H01Q 3/242* (2013.01); *H01Q 5/314* (2015.01)

(58) Field of Classification Search
CPC ...... H01Q 21/065; H01Q 3/005; H01Q 3/242; H01Q 5/314; H01Q 3/36; H01Q 9/0414; H01Q 21/08; H01Q 21/24
See application file for complete search history.

(56) References Cited

U.S. PATENT DOCUMENTS 6,147,648 A 11/2000 Granholm et al.
6,211,824 B1 4/2001 Holden et al.
(Continued)

FOREIGN PATENT DOCUMENTS

CN 110911834 A 3/2020
KR 10-2006-0009816 A 2/2006
(Continued)

OTHER PUBLICATIONS

Russian Search Report dated Apr. 26, 2023, issued in Russian Patent Application No. 2021121142.
(Continued)

*Primary Examiner* — David E Lotter
(74) *Attorney, Agent, or Firm* — Jefferson IP Law, LLP

(57) ABSTRACT

The disclosure relates to radio engineering, and more specifically to a wide scanning patch antenna array. The technical result consists in extending the scanning range of the antenna array, increasing its efficiency and reducing losses. An antenna array is provided. The antenna array includes a printed circuit board on which at least two patch antennas are located, each having at least one feeding port, wherein, the patch antennas are rotated relative to each other around the normal in the center of symmetry of the patch antenna in such a way that the corresponding feeding ports of the patch antennas related to the same polarization are rotated by 180 degrees relative to each other, wherein the phases of the signals applied to said feeding ports rotated relative to each other, differ by 180 degrees plus a phase shift for scanning control, a dielectric radome located above the printed circuit board, and passive beamforming elements of the array elements, located on the radome above the patch antennas.

20 Claims, 2 Drawing Sheets

(56) References Cited

U.S. PATENT DOCUMENTS

| | | | | |
|---|---|---|---|---|
| 8,928,544 | B2 | 1/2015 | Massie et al. | |
| 2017/0346177 | A1* | 11/2017 | Nagata | H01Q 21/065 |
| 2019/0267718 | A1* | 8/2019 | Rajagopalan | H01Q 1/523 |
| 2020/0144729 | A1 | 5/2020 | Suzuki et al. | |
| 2020/0358165 | A1 | 11/2020 | Jeong et al. | |
| 2021/0066791 | A1 | 3/2021 | Park et al. | |
| 2021/0175617 | A1* | 6/2021 | Chen | H01Q 1/246 |

FOREIGN PATENT DOCUMENTS

| | | | |
|---|---|---|---|
| RU | 2 473 157 | C1 | 1/2013 |
| WO | 2018/230039 | A1 | 12/2018 |

OTHER PUBLICATIONS

International Search Report dated Apr. 12, 2022, issued in International Patent Application No. PCT/KR2021/019956.

Jaglan et al., Surface waves minimization in Microstrip Patch Antenna using EBG substrate, 2015.

Alibakhshikenari et al., Meta-Surface Wall Suppression of Mutual Coupling between Microstrip Patch Antenna Arrays for THz-Band Applications, 2018.

Steyskal, On the Merit of Asymmetric Phased Array Elements, IEEE Transactions on Antennas and Propagation, vol. 61, No. 7, Jul. 2013.

Isa et al., A Technique of Scan Blindness Elimination for Planar Phased Array Antenna using Miniaturized EBG, 2014.

* cited by examiner

WIDE SCANNING PATCH ANTENNA ARRAY

CROSS-REFERENCE TO RELATED APPLICATION(S)

This application is a continuation application, claiming priority under § 365(c), of an International application No. PCT/KR2021/019956, filed on Dec. 27, 2021, which is based on and claims the benefit of a Russian patent application number 2021121142, filed on Jul. 16, 2021, in the Russian Intellectual Property Office, the disclosure of which is incorporated by reference herein in its entirety.

TECHNICAL FIELD

The disclosure relates to radio engineering. More particularly, the disclosure relates to a wide scanning patch antenna array.

BACKGROUND ART

The constantly rising needs of users cause rapid development of communication technologies. Currently, there is an active development of promising $5^{th}$ generation (5G) and $6^{th}$ generation (6G) communication networks, which will be characterized by higher performance indicators, such as high transmission speed and greater energy efficiency.

New applications require the introduction of a new class of radio systems capable of transmitting/receiving data/energy and capable of adaptively changing the characteristics of the radiated electromagnetic field. An important component of such systems are steerable antenna arrays, which find their application in data transmission systems such as 5G (28 GHz), WiGig (60 GHz), Beyond 5G (60 GHz), 6G (sub THz), long-distance wireless power transmission systems (LWPT) (24 GHz), automotive radar systems (24 GHz, 79 GHz), etc.

Millimeter-wave antenna arrays used in these areas must meet several main requirements:

low losses and high gain;

beam flexible steering (direction of maximum radiation), i.e., beam scanning and focusing the emitted field in a wide range of angles;

compact, cheap, simple design applicable for mass production.

Currently, when creating millimeter-wave radiators, the technology of printed circuit boards (PCB) is widely used, since this technology makes it possible to obtain devices characterized by simplicity of design and producibility, ease of integration on a single substrate with other electronic assemblies, the ability to achieve a wide bandwidth of operating frequencies.

A patch antenna array is an array of patch antennas.

Existing millimeter-wave antenna technologies have some limitations that significantly affect their applicability:

- small distance between the feeding ports of antenna elements;
- surface waves propagation in PCB antennas;
- considerable falling of gain at great scan angles;
- extremely stringent requirements for manufacturing accuracy, etc.

When used in communication systems, the main requirements for an antenna array as part of a base station are providing full all-round (360 degrees) beam scanning at azimuth and operation with double polarization. That scanning is realized by means of combining a few antenna arrays with the finite scanning sector. Obviously, the number of arrays required for a base station is defined by the scanning range of the individual arrays used. So, if an antenna array scanning sector is restricted by ±45 degrees, which is typical for antenna arrays currently used in base stations, then 4 arrays are demanded to provide a full all-round (360 degrees) beam scanning. When the scanning sector is extended to ±60 degrees, only 3 arrays are required for the array. Thus, an increase in the scanning sector of an antenna array can lead to a decrease in the demanded number of antenna arrays to provide a given scanning angle and, accordingly, reduce the complexity of antenna array steering.

The above information is presented as background information only to assist with an understanding of the disclosure. No determination has been made, and no assertion is made, as to whether any of the above might be applicable as prior art with regard to the disclosure.

DISCLOSURE

Technical Problem

Currently known patch antenna arrays often have the disadvantage of asymmetric radiation pattern of a single patch antenna in the entire array, which leads to the resulted asymmetry while antenna array beam formation. The effect of this is the unjustified gain loss at wide scanning angles (more than 50 degrees). It should be noted that in case of beam deviation on an angle of more than 45 degrees, the gain of the array is degraded considerably on the one side of scanning of the two due to the asymmetry of the radiation pattern of a single antenna array element.

The aforementioned asymmetry occurs due to the following reasons.

FIG. 1 schematically shows a top view and cross-sectional side view of a portion of an antenna array according to the related art.

Referring to FIG. 1, the theory-known periodical structure of the antenna array is a reason of parasitic surface waves (PSW) appearance. Due to the asymmetrical structure of the antenna array element with feeding lines, the propagation of PSW has a certain direction. The radiation efficiency of the antenna array element falls significantly because of the interference of the main wave emitted by the array element and the parasitic surface wave. As a result, there is an undesirable gain loss of the array element at some angle of radiation relative to the normal.

In the opposite direction, there is no propagation or emission of the PSW, and therefore there is no interference between the PSW and the main wave of the radiator. As a result, the opposite angle has no gain loss in this direction of radiation.

A prior art solution is known, disclosed in document U.S. Pat. No. 6,147,648 A, relating to a dual polarization antenna array comprising many antenna elements, in which feeding only one polarization is alternated from one to other to suppress cross-polarization and to decrease grating lobes. The position of the second polarization ports is constant for all antenna elements. However, such an antenna array does not allow suppressing a parasitic surface wave due to its periodic structure, as a result of which radiation pattern asymmetry is observed at large angles. In addition, such an antenna array does not allow scanning a beam.

Article "Surface waves minimization in Microstrip Patch Antenna using EBG substrate" by Naveen Jaglan and Samir Dev Gupta, published in 2015 INTERNATIONAL CONFERENCE ON SIGNAL PROCESSING AND COMMU- NICATION (ICSC), describes a printed antenna array with an EBG (electromagnetic band gap) surface with a resonant frequency lying in the band gap of the EBG substrate. The EBG element represents a small patch with shorting via in the center. Two adjacent elements form the resonator and their combination suppresses parasitic surface waves. As a result, some improvement in antenna performance is appeared. However, sufficient space between elements is required for disposing of the EBG structure and this space is restricted by maximum acceptable distance between elements. Thus, additional space is required such a solution, which significantly limits its applicability. Moreover, such an antenna array functions with only one polarization.

Article "Meta-Surface Wall Suppression of Mutual Coupling between Microstrip Patch Antenna Arrays for THz-Band Applications" by Mohammad Alibakhshikenari, Bal S. Virdee, etc., published in Progress In Electromagnetics Research Letters, vol. 75, p. 105-111, 2018, describes a patch antenna array with meta-surface walls to increase insulation between patch antenna radiators. Thus, this solution also requires additional space, which significantly limits its applicability, and is operating with only one polarization.

Article "On the Merit of Asymmetric Phased Array Elements" by Hans Steyskal, published in IEEE TRANSACTIONS ON ANTENNAS AND PROPAGATION, vol. 61 (7), July 2013, describes a patch antenna with non-symmetrical patches. The patch design is obtained by numerical optimization using a genetic algorithm. However, for realization of an optimal non-symmetrical structure the additional space is required. Moreover, such an antenna array is operating with only one polarization.

U.S. Pat. No. 6,211,824 B1 describes an antenna array using multiple patch elements to control the direction of a beam with large scanning angles. The antenna contains a first combined substrate, a plurality of first patch radiators are arranged on the surface of the first substrate, and a plurality of second patch radiators are arranged on the surface of the second substrate. First substrate is formed from regions with alternated dielectric constant to effectively prevent surface wave propagation, thereby increasing the scan volume of the antenna. However, this solution has a very complicate producing technology excepting of PCB technology application because of multiplex alternated regions with difference permittivity. In addition, such an antenna array operates with only one polarization and is unsuitable for applications in the millimeter and submillimeter ranges. Moreover, such an antenna array is operating with only one polarization and is not able of application for mm and sub mm band.

Thus, there is a need in the art for a simple and inexpensive steerable antenna structure with a wide beam scan angle, low loss, compact size, and high gain.

Technical Solution

Aspects of the disclosure are to address at least the above-mentioned problems and/or disadvantages and to provide at least the advantages described below. Accordingly, an aspect of the disclosure is to provide a wide scanning patch antenna array.

Additional aspects will be set forth in part in the description which follows and, in part, will be apparent from the description, or may be learned by practice of the presented embodiments.

In accordance with an aspect of the disclosure, an antenna array is provided. The antenna array includes a printed circuit board on which at least two patch antennas are located, each having at least one feeding port, wherein, the patch antennas are rotated relative to each other around the normal in the center of symmetry of the patch antenna in such a way that the corresponding feeding ports of the patch antennas related to the same polarization are rotated by 180 degrees relative to each other, wherein the phases of the signals applied to said feeding ports rotated relative to each other, differ by 180 degrees plus a phase shift for scanning control, a dielectric radome located above the printed circuit board, and passive beamforming elements of each array element, located on the radome above the patch antennas.

According to an embodiment of the antenna array, neighboring patch antennas are rotated around the normal in the center of symmetry of the patch antenna by 180 degrees relative to each other.

According to another embodiment of the antenna array, the passive elements are located on the surface of the radome facing the PCB above the patch antennas.

According to another embodiment of the antenna array, the distance between the PCB surface and the radome is approximately $$\frac{\lambda_0}{10},$$

and the thickness of the radome is taken to ensure transparency for radiation as follows:

$$h_{radome} = \frac{\lambda_o}{2\sqrt{\varepsilon}} + \Delta,$$

where $\lambda_0$ is average wavelength of the operating frequency band, $\varepsilon$ is a dielectric constant of the radome material, $\Delta$ is correction for compensation of metallic element reactive influence.

According to another embodiment of the antenna array, the passive elements have axial symmetry with respect to the polarization direction of the patch antennas.

According to another embodiment of the antenna array, the gap between the radome and the PCB is an air gap or is filled with a dielectric layer.

According to another embodiment, the antenna array comprises several subarrays, wherein the patch antennas are equally spaced within each subarray, with patch antennas of the neighboring subarrays rotated relative to each other.

In another embodiment, the antenna array is a double polarization antenna array.

Advantageous Effects

The disclosure provides a steerable antenna with a simple design, low loss, compact size, high gain, capable of focusing/scanning the beam.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In accordance with an embodiment, the disclosure is a phased array antenna comprising:

- a printed circuit board on which at least two patch antennas are located, each having at least one feeding port, wherein feeding ports of the neighboring patch antennas are rotated round the normal of the patch antenna relative to each other;
- a dielectric radome located above the printed circuit board;
- passive beamforming elements of each array element, located on the radome above the patch antennas.

Figure 2:
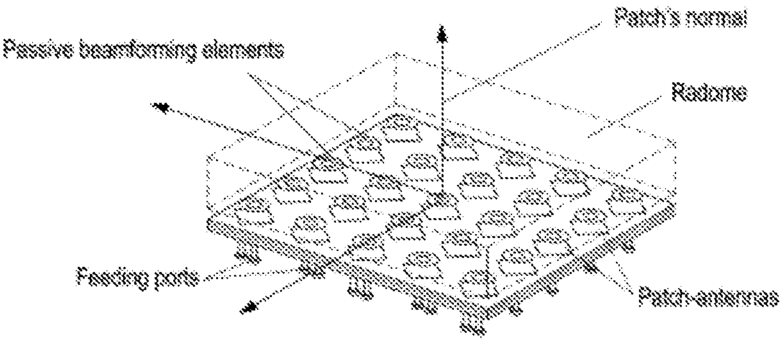
FIG. 2 is a general view of an antenna array structure according to an embodiment of the disclosure.

FIG. 2 is a general view of an antenna array structure according to an embodiment of the disclosure.

Figure 3:
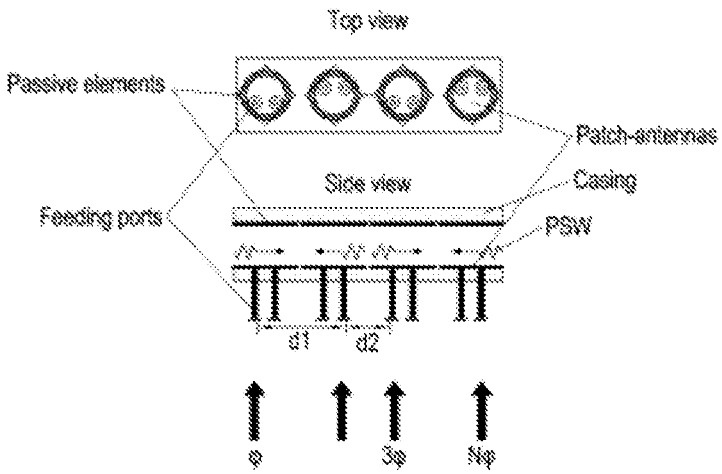
FIG. 3 is a schematic top view and cross-sectional side view of a portion of an antenna array according to an embodiment of the disclosure.

FIG. 3 is a schematic top view and cross-sectional side view of a portion of an antenna array according to an embodiment of the disclosure.

Referring to FIGS. 2 and 3, an embodiment of an antenna array in accordance with the disclosure will be described in detail.

The printed circuit board has a plurality (at least two) patch antennas located thereon, which, when operated, together form an antenna array beam. Each patch antenna is excited by applying a signal to it via at least one feeding port, which determines the beamforming polarization. In an embodiment, the feeding port is a via. Although, FIGS. 2 and 3 show double-polarized antenna elements, i.e., elements capable of forming two beams with different polarizations, the disclosure can also be used in a similar way for antenna elements with one polarization. The patch antennas are single antenna elements of the antenna array.

In an embodiment of the disclosure, neighboring patch antennas are rotated around the normal in the center of symmetry of the patch antenna by 180 degrees relative to each other (see FIG. 3), resulting in a corresponding rotation of the feeding ports of these antenna elements also by 180 degrees. The phase of the signal applied via the feeding port on the rotated patch antennas is selected in such a way as to compensate for the change in the position of the port in the patch antenna.

Figure 1:
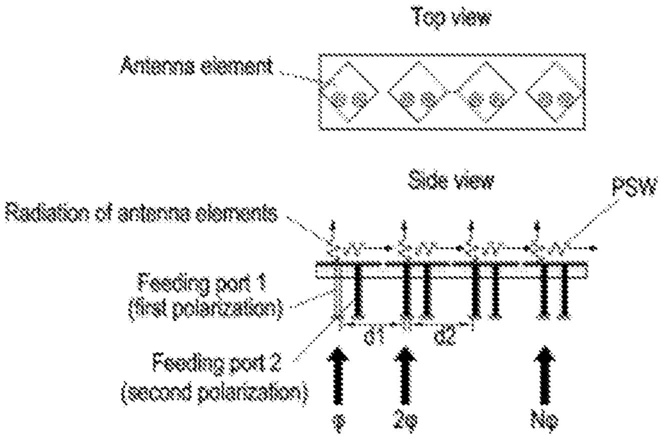
FIG.1 (RELATED ART)
FIG. 1 schematically shows a top view and cross-sectional side view of a portion of an antenna array according to the related art.

Referring to FIG. 3, the neighboring patch antennas in the antenna array are geometrically rotated by 180 degrees relative to each other in the plane of the printed circuit board. It should be noted that the rotation of the antenna elements relative to each other also leads to the rotation of the corresponding feeding ports belonging to the same polarization. As it can be seen in FIG. 1, the distances between the corresponding ports of the patch elements belonging to the same polarization are equal to each other (d1=d2= . . . =dN), which characterizes the periodicity of the structure. This periodic structure provides PSW propagation in the antenna array. At the same time, in an embodiment of the disclosure (see FIG. 3), the distances between the respective ports of the neighboring patch elements belonging to the same polarization are different (d1≠d2) due to rotation of the patch antennas relative to each other. This disturbs the periodicity of the structure and suppresses the propagation of the in-phase surface wave. As it can be seen in FIG. 3, surface waves cancel each other out. As a result, the level of spurious radiation is significantly reduced. Extension of the radiation pattern of a separate antenna element of the array, provided by such a mutual arrangement of patch antennas, makes it possible to increase the scanning range of the beam of the entire antenna array.

In this case, the rotation of the antenna element also requires signal phase correction (by 180 degrees plus the phase shift for scanning control) arriving at the feeding port of the rotated antenna element to compensate for the changed position of the patch (see FIG. 3). This allows keeping the needed polarization of the antenna array. If there is no signal phase correction, the radiation of neighboring patch elements will be in antiphase and there will be no beamforming (main lobe).

The new phase distribution can be represented as follows:

$$\varphi_{(2n-1)}=(2n-2)*\Delta\psi,$$

$$\varphi_{2n}=(2n-1)*\Delta\psi+180°,$$

where $\varphi_{(2n-1)}$ is the phase of the reference element, $\varphi_{2n}$ is the phase of the element rotated relative to the reference element, n=1, 2, . . . , N/2, where N is the total number of elements, $\Delta\psi$ is a discrete phase jump between the neighboring elements, defined by the angle of beam deflection from the normal to the antenna array. The elements n are counted from the extreme element on either side of the array.

The solution described above makes it possible to achieve an almost symmetric radiation pattern when scanning in both directions (in a sector of ±60 degrees). However, losses at such large scan angles are still significant.

The signal phase can be controlled in at least two ways:

the required phase and the required 180 degree phase compensation can be set for each channel by means of a control radio-frequency integrated circuit (RFIC);

180 degree phase correction can be performed by means of an additional phase delay line in the signal path of the feeding port, i.e., the value of phase delay can be set by presetting the length of said additional line.

Referring to FIGS. 2 and 3, an antenna array in accordance with an embodiment of the disclosure further includes a dielectric radome (casing, shield) located above the printed circuit board. On the surface of the radome facing the printed circuit board, over the patch antennas, passive elements are formed for beamformation of the array elements, which are metal elements that enable expansion of the beamformation of individual antenna elements. This leads to improved scanning performance of the entire antenna array.

Passive elements are secondary radiators excited by the main elements. Since they do not have an output feeder, the power induced on them is re-radiated. This secondary field, adding up with the main radiator field, forms a new directional pattern with the required parameters depending on the size of these elements, their shape and distance from the main elements.

In alternative embodiments, the passive elements can be formed inside the dielectric layer of the radome or on its top surface facing away from the printed circuit board. In addition, passive elements can be implemented as stacked multilayer elements. This makes it possible to further increase the operating frequency band of the antenna array.

The distance between the surface of the printed circuit board and the radome is approximately $$\frac{\lambda_0}{10},$$

where $\lambda_0$ is an average wavelength of the operating frequency band. With such a distance, the best effect of broadening the radiation pattern of the main element in conjunction with the passive element is achieved.

The thickness of the radome is taken to ensure transparency for radiation as follows:

$$h_{radome} = \frac{\lambda_o}{2\sqrt{\varepsilon}} + \Delta,$$

where $\lambda_0$ is average wavelength of the operating frequency band, $\varepsilon$ is a dielectric constant of the radome material, $\Delta$ is correction for compensation of metallic element reactive influence, which, depending on the shape of the elements, their location and structure of the radome, is set analytically or tabularly from the radome reference books, or determined by simulation.

Passive elements shall be of comparable size to patch antennas. In the embodiment of FIGS. 2 and 3, these passive members are in the form of rings. However, these passive elements can be of any other suitable shape that is axially symmetric with respect to polarization directions of the patch antenna. For a single polarization antenna array, passive elements shall have axial symmetry with respect to only one direction of polarization of the patch antennas, while for a double polarization antenna array, passive elements shall have axial symmetry with respect to both directions of polarization of the patch antennas.

This structure of the antenna array makes it possible to obtain a symmetric radiation pattern with losses of less than 3 dB even in the extreme scanning positions in the range of ±60 degrees. In addition, the radome protects the antenna array from the environment.

Passive elements formed on the radome do not require additional space on the printed circuit board of the antenna array, which allows keeping the compact size of the antenna array.

The gap between the radome and the PCB can be an air gap or it can be filled with a dielectric layer.

Figure 4:
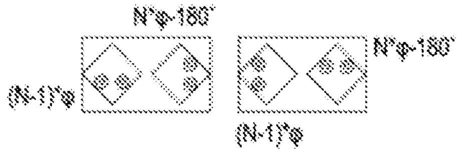
FIG. 4 depicts an alternative arrangement of patch antennas in an antenna array according to an embodiment of the disclosure.

FIG. 4 depicts an alternative arrangement of patch antennas in an antenna array according to an embodiment of the disclosure.

Referring to FIG. 4, in the case of a double polarization antenna array, the antenna elements can also be rotated by ±90 degrees rather than by 180 degrees. In this case, the feeding port and phase compensation are selected to keep the needed excited polarization in the patch element. This structure is flexible for complex supply systems, however, the surface parasitic waves are suppressed only for radiation with one polarization.

According to an alternative embodiment, said rotation may be not for individual antenna elements, but for fragments of the antenna array, i.e. subarrays, including several antenna elements (for example, 2×2, 4×4, etc.). In this case, said subarrays shall be identical. Thus, within each subarray, patch antennas are located identically, with patch antennas of neighboring subarrays rotated relative to each other. This structure also makes it possible to suppress the propagation of surface waves in the antenna array. Such a structure is easier to manufacture, and said subarrays can be made on different printed circuit boards.

In the above-described embodiment of the disclosure, the patch antennas are in the shape of a square. However, as an alternative, said patch antennas can have another shape, preferably an axisymmetric shape (circle, hexagon, etc.).

Thus, the disclosure makes it possible to extend the scanning range of the antenna array, improve its efficiency and reduce losses. At the same time, the antenna array in accordance with the disclosure has a compact size as well as a simple and inexpensive design suitable for mass production.

The antenna array of the disclosure is designed for use in the millimeter wavelength range. However, alternatively, any wavelength ranges can be used for which it is possible to carry out radiation and controlled directivity of electromagnetic waves. For example, shortwave, submillimeter (terahertz) radiation, etc. can be used as an alternative.

The compact and highly efficient steerable antenna array systems in accordance with the disclosure can find application in wireless communication systems of the promising 5G, 6G and WiGig standards. Moreover, the disclosure can be used both in base stations and in antennas of mobile terminals. In this case, the base station implements time-shared beam steering among users. The user terminal antennas are steered to point to the base station antenna position.

The disclosure can find application in all types of LWPT systems: outdoor/indoor, automotive, mobile, etc. This ensures high efficiency of power transmission in all scenarios. The power transmission device can be built on the basis of the described structure of the antenna array and thus can implement beam focusing when charging devices in the near field or scanning the beam for transmitting power to devices located in the far zone of the transmitter antenna.

When used in robotics, the proposed antenna can be used to detect/avoid obstacles.

The disclosure can also be used in autonomous vehicle radars.

It should be understood that although terms such as "first", "second", "third" and the like may be used herein to describe various elements, components, regions, layers and/or sections, these elements, components, areas, layers and/or sections should not be limited by these terms. These terms are used only to distinguish one element, component, region, layer or section from another element, component, region, layer or section. Thus, the first element, component, region, layer or section may be called a second element, component, region, layer or section without departing from the scope of the disclosure. As used herein, the term "and/or" includes any and all combinations of one or more of the respective listed positions.

The functionality of an element specified in the description or claims as a single element can be implemented in practice by several components of the device, and vice versa, the functionality of elements specified in the description or in the claims as several separate elements can be implemented in practice by a single component.

The embodiments of the disclosure are not limited to the embodiments described herein. Basing on the information set forth in the description and knowledge of the prior art, those skilled in the art will appreciate other embodiments of the disclosure which are not apart from the essence and scope of this disclosure.

Elements mentioned in the singular do not exclude the plurality of elements, unless otherwise specified.

A person skilled in the art should understand that the essence of the disclosure is not limited to a specific software or hardware implementation, and therefore any software and hardware known in the prior art can be used to implement the disclosure. So, hardware can be implemented in one or more specialized integrated circuits, digital signal processors, digital signal processing devices, programmable logic devices, user-programmable gate arrays, processors, controllers, microcontrollers, microprocessors, electronic devices, other electronic modules capable of performing the functions described in this document, a computer, or a combination of the above.

Obviously, when it comes to storing data, programs, etc., the presence of a computer-readable storage medium is implied. Examples of computer-readable storage media include read only memory (ROM), random access memory, register, cache memory, semiconductor storage devices, magnetic media such as internal hard disks and removable disks, magneto-optical media, and optical media such as compact disc (CD)-ROM and digital versatile discs (DVDs), as well as any other storage media known in the art.

While the disclosure has been shown and described with reference to various embodiments thereof, it will be understood by those skilled in the art that various changes in form and details may be made therein without departing from the spirit and scope of the disclosure as defined by the appended claims and their equivalents.

The features mentioned in various dependent claims, as well as the embodiments disclosed in various parts of the description, can be combined to achieve advantageous effects, even if the possibility of such combination is not explicitly disclosed.

The invention claimed is:

1. An antenna array comprising:

at least two patch antennas, each patch antenna of the at least two patch antennas having a feeding port, wherein the at least two patch antennas include a first patch antenna and a second patch antenna related to a same polarization;

a printed circuit board (PCB) on which the at least two patch antennas are located, the first patch antenna being rotated relative to the second patch antenna around a normal in a center of symmetry of the first patch antenna in such a way that corresponding feeding ports of the first patch antenna and the second patch antenna are rotated by 180 degrees relative to each other, and phases of signals applied to the feeding ports of the first patch antenna and the second patch antenna differ by 180 degrees plus a phase shift for scanning control;

a dielectric radome located above the printed circuit board; and passive beamforming elements, located between the dielectric radome and the at least two patch antennas, configured to alter a signal radiation direction of the at least two patch antennas.

2. The antenna array according to claim 1, wherein neighboring patch antennas of the at least two patch antennas are rotated around a normal in a center of symmetry by 180 degrees relative to each other.

3. The antenna array according to claim 1, wherein the passive beamforming elements are located on a surface of the dielectric radome facing the PCB above the at least two patch antennas.

4. The antenna array according to claim 1, wherein a distance between a PCB surface and the dielectric radome is approximately $$\frac{\lambda_0}{10},$$

and wherein a thickness of the dielectric radome is taken to ensure transparency for radiation as follows:

$$h_{radome} = \frac{\lambda_o}{2\sqrt{\varepsilon}} + \Delta,$$

where $\lambda_0$ is average wavelength of an operating frequency band, $\varepsilon$ is a dielectric constant of a dielectric radome material, $\Delta$ is correction for compensation of metallic element reactive influence.

5. The antenna array according to claim 1, wherein the passive beamforming elements have axial symmetry with respect to a polarization direction of the at least two patch antennas.

6. The antenna array according to claim 1, wherein a gap between the dielectric radome and the PCB is an air gap or is filled with a dielectric layer.

7. The antenna array according to claim 1, further comprising a plurality of subarrays, wherein the at least two patch antennas are equally spaced within each subarray of the plurality of subarrays, with patch antennas of the at least two patch antennas of neighboring subarrays rotated relative to each other.

8. The antenna array according to claim 1, wherein the antenna array is a double polarization antenna array.

9. An antenna array comprising:

a printed circuit board (PCB);

at least two patch antennas disposed on the PCB, each patch antenna of the at least two patch antennas having a feeding port, wherein the at least two patch antennas include a first patch antenna and a second patch antenna related to a same polarization; and passive beamforming elements, located above the at least two patch antennas, wherein the first patch antenna being rotated relative to the second patch antenna around a normal in a center of symmetry of the first patch antenna in such a way that corresponding feeding ports of the first patch antenna and the second patch antenna are rotated by 180 degrees relative to each other, wherein, via the corresponding feeding ports, each of the first patch antenna and the second patch antenna are provided with a signal of which phases differ by 180 degrees plus a phase shift relative to each other for scanning control.

10. The antenna array according to claim 9, further comprising:

a dielectric radome located above the PCB, wherein the passive beamforming elements are located on the dielectric radome above the patch antennas, wherein a distance between a PCB surface and the dielectric radome is approximately $$\frac{\lambda_0}{10}.$$

11. The antenna array according to claim 10, wherein a gap between the dielectric radome and the PCB is an air gap or is filled with a dielectric layer.

12. The antenna array according to claim 10, wherein the passive beamforming elements are located on a surface of the dielectric radome facing the PCB above the at least two patch antennas.

13. The antenna array according to claim 10, wherein the passive beamforming elements have axial symmetry with respect to a polarization direction of the at least two patch antennas.

14. The antenna array according to claim 9, further comprising:

a dielectric radome located above the PCB; and wherein the passive beamforming elements are located on the dielectric radome above the at least two patch antennas, wherein a thickness of the dielectric radome is taken to ensure transparency for radiation as follows:

$$h_{radome} = \frac{\lambda_o}{2\sqrt{\varepsilon}} + \Delta,$$

where $\lambda_0$ is average wavelength of an operating frequency band, ε is a dielectric constant of a dielectric radome material, and Δ is a correction for compensation of metallic element reactive influence.

15. The antenna array according to claim 14, wherein the passive beamforming elements are located on a surface of the dielectric radome facing the PCB above the patch antennas.

16. The antenna array according to claim 14, wherein the passive beamforming elements have axial symmetry with respect to a polarization direction of the at least two patch antennas.

17. The antenna array according to claim 9, further comprising a plurality of subarrays, wherein the at least two patch antennas are equally spaced within each subarray of the plurality of subarrays, with patch antennas of neighboring subarrays rotated relative to each other.

18. The antenna array according to claim 9, wherein the antenna array is a double polarization antenna array.

19. The antenna array according to claim 9, wherein each patch antenna of the at least two parch antennas is excited by applying a signal to each patch antenna via the feeding port.

20. The antenna array according to claim 9, wherein a phase of the signal applied via the feeding port on the first patch antenna and the second patch antenna are selected to compensate for a change in a position of the feeding port in the corresponding patch antenna.

* * * * *